United States Patent
Asiri et al.

(10) Patent No.: US 11,340,187 B1
(45) Date of Patent: May 24, 2022

(54) SURFACE MODIFIED ELECTRODES AND METHODS OF PREPARATION THEREOF

(71) Applicant: KING ABDULAZIZ UNIVERSITY, Jeddah (SA)

(72) Inventors: Abdullah Mohamed Asiri, Jeddah (SA); Mohammed Muzibur Rahman, Jeddah (SA); Khalid A. Alamry, Jeddah (SA); Jahir Ahmed, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/520,843

(22) Filed: Nov. 8, 2021

(51) Int. Cl.
*G01N 27/30* (2006.01)
*C01G 19/02* (2006.01)
*C01G 3/02* (2006.01)
*B82Y 40/00* (2011.01)
*C08L 27/18* (2006.01)

(52) U.S. Cl.
CPC ............... *G01N 27/30* (2013.01); *C01G 3/02* (2013.01); *C01G 19/02* (2013.01); *C08L 27/18* (2013.01); *B82Y 40/00* (2013.01); *C01P 2004/10* (2013.01); *C01P 2004/64* (2013.01); *C01P 2006/40* (2013.01); *C08L 2203/206* (2013.01)

(58) Field of Classification Search
CPC .......... G01N 27/30; C01G 3/02; C01G 19/02; C08L 27/18; C08L 2203/206; B82Y 40/00; C01P 2004/10; C01P 2004/64; C01P 2006/40
See application file for complete search history.

(56) References Cited

FOREIGN PATENT DOCUMENTS

CN 108593711 A * 9/2018
KR 101525102 B1 * 6/2015

OTHER PUBLICATIONS

Zhang, Bo, and Pu-Xian Gao. "Metal oxide nanoarrays for chemical sensing: a review of fabrication methods, sensing modes, and their inter-correlations." Frontiers in Materials 6 (2019): 55.*
Rahman, Mohammed M., et al. "Fabrication of selective and sensitive chemical sensor probe based on ternary nano-formulated CuO/MnO 2/Gd 2 O 3 spikes by hydrothermal approach." Scientific Reports 10.1 (2020): 1-14.*
Chang, Hsing-Cheng, et al. "A metal-oxide doped SnO 2-based microsensor for measuring H 2 S concentration." 2017 International Conference on Applied System Innovation (ICASI). IEEE, 2017.*

\* cited by examiner

*Primary Examiner* — Richard M Rump
(74) *Attorney, Agent, or Firm* — WC&F IP

(57) ABSTRACT

A surface modified electrode, and methods for preparing the surface modified electrode for use in an electrochemical sensor for detection of an analyte is described. The surface modified electrode includes a copper oxide (CuO) co-doped tin dioxide ($SnO_2$) nano-spikes disposed over a gold-plated chip. The surface modified electrode further includes a polymer matrix (nafion) configured to bind the gold-plated chip with the copper oxide (CuO) co-doped tin dioxide ($SnO_2$) nano-spikes. The present disclosure also relates to a process of preparing the surface modified electrode. The surface modified electrode of the present disclosure can be used in electrochemical sensors for detection of analytes, like 4-nitrophenol (4-NP).

19 Claims, 7 Drawing Sheets

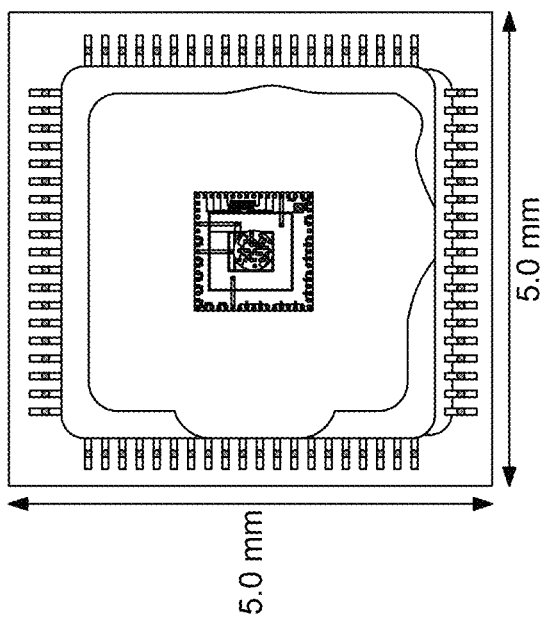
FIG. 4A
FIG. 4B
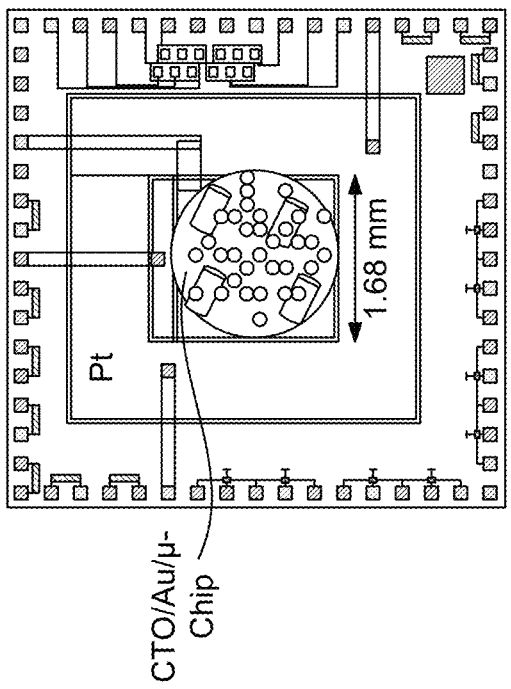
FIG. 4C
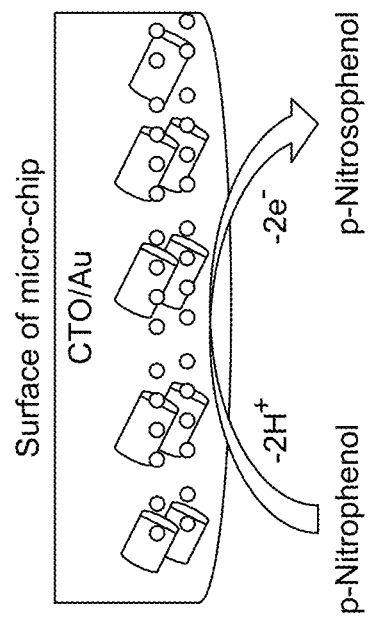
FIG. 4D
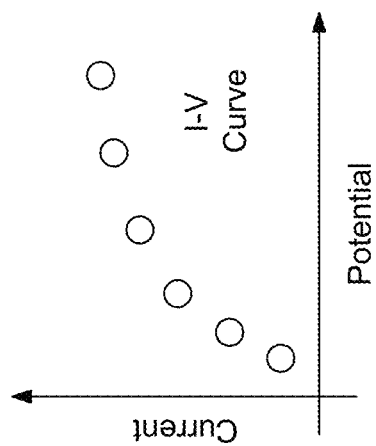
FIG. 4E

SURFACE MODIFIED ELECTRODES AND METHODS OF PREPARATION THEREOF

TECHNICAL FIELD

The present disclosure relates to surface modified electrodes and, more specifically, relates to the surface modified electrodes for use in an electrochemical sensor for detection of phenolic compounds.

BACKGROUND

Generally, phenolic compounds are widely used in pharmaceutical, dye, pesticide industries, etc., which are recognized as toxic for the environment. Phenol derivatives are also harmful to organisms and plants. 4-Nitrophenol (4-NP) is the active constituent of parathion-insecticide, which causes anxiety, headaches, drowsiness, nausea, and cyanosis. It is recognized as a major environmental pollutant by the US Environmental Protection Agency (EPA). Thus, the development of an efficient technique to detect 4-NP for ecological and food safety becomes vital. So far, very few analytical techniques are introduced for selective and sensitive detection of 4-NP.

Conventional electrochemical techniques are often convenient in various ways such as quick response, cost effective, and handy in nature with excellent selectivity towards 4-NP. Common electrodes like gold, platinum, and glassy carbon electrodes showed better performance in electrochemical sensing. However, high concentrations of 4-NP need to be present to be detectable by the conventional electrodes. Certain other electrodes conventionally employed for detection of 4-NP include electrodes modified with carbonaceous nanomaterials such as carbon paste, carbon nanotubes, and graphene electrodes. Nano-graphene has excellent detection capabilities owing to its exceptional charge-transport property, larger surface to volume ratio, and excellent electro-catalytic property, etc. Graphene/graphene oxide fabricated electrodes can detect 4-NP up to several hundred nano-molar levels. Unfortunately, none of these methods is handy, reliable, and cheap in on-field detection. Owing to drawbacks associated with conventional methods, there exists a need to develop electrochemical devices or sensors that are cost-effective, reliable, sensitive, with high degree of selectivity towards 4-NP at nanomolar concentrations.

SUMMARY

In one aspect of the present disclosure, a surface modified electrode is disclosed. The surface modified electrode includes a gold-plated chip, and copper oxide (CuO) co-doped tin dioxide ($SnO_2$) nano-spikes disposed over the gold-plated chip. In an embodiment, the copper oxide (CuO) co-doped tin dioxide ($SnO_2$) nano-spikes have an average diameter in a range of about 10.0 to 30.0 nanometers. In another embodiment, the copper oxide (CuO) co-doped tin dioxide ($SnO_2$) nano-spikes have an average particle size of about 12.5 nanometers. The surface modified electrode further includes a polymer matrix configured to bind the gold-plated chip with the copper oxide (CuO) co-doped tin dioxide ($SnO_2$) nano-spikes. In an embodiment, the polymer matrix is a sulfonated tetrafluoroethylene-based fluoropolymer (NAFION or NFN).

In another aspect of the present disclosure, an electrochemical sensor for detecting an analyte is disclosed. In an embodiment, the analyte is selected from a group consisting of ethanol, hydrazine, nitrophenols, chloroform, methanol, phenyl hydrazine, aminophenol and chlorophenol. The electrochemical sensor includes the surface modified electrode, where the surface modified electrode includes the gold-plated chip; copper oxide (CuO) co-doped tin dioxide ($SnO_2$) nano-spikes disposed over the gold-plated chip, and the polymer matrix configured to bind the gold-plated chip with the copper oxide (CuO) co-doped tin dioxide ($SnO_2$) nano-spikes. The electrochemical sensor is configured to determine a change in chemical information caused by the analyte on contact with at least a portion of the surface modified electrode; and transduce the change in chemical information associated with the analyte to an electrical signal. In an embodiment, the electrical signal is indicative of a concentration level of the analyte. In an embodiment, the analyte is 4-nitrophenol (4-NP). In an embodiment, the electrochemical sensor for detecting the 4-NP has a sensitivity of 1.78 $\mu A \mu M^{-1}\ cm^{-2}$ and configured to detect 4-nitrophenol across a concentration range of 2.3 pM. In some embodiments, the electrochemical sensor for detecting the 4-NP has a linear dynamic range across a range of 0.1 nanomolar to 1.0 micromolar; linearity value in the linear dynamic range as 0.9994; a response time of about 10 seconds; and a limit of quantification of about 7.67 picomolar. In an embodiment, the electrochemical sensor incudes a platinum wire as a counter-electrode.

In yet another aspect of the present disclosure, a method of preparing the surface modified electrode is disclosed. The method includes disposing copper oxide (CuO) co-doped tin dioxide ($SnO_2$) nano-spikes over the gold-plated chip in the presence of the polymer matrix to form a film. The film is further dried to obtain the surface modified electrode. In an embodiment, the method includes drying the film at a temperature range of about 40-45° C. for a period of about 1-3 hours to obtain the surface modified electrode.

In an embodiment, the method further includes preparing the copper oxide (CuO) co-doped tin dioxide ($SnO_2$) nano-spikes by mixing an equimolar solution of a copper salt and a tin salt in an alkaline solution to obtain a first mixture, precipitating the first mixture with an organic solvent to obtain a second mixture, and heating the second mixture to obtain the copper oxide (CuO) co-doped tin dioxide ($SnO_2$) nano-spikes. The copper salt is copper chloride ($CuCl_2$), the tin salt is stannous chloride ($SnCl_2$), and the alkaline solution includes ammonium hydroxide. The method further includes mixing an equimolar solution of the copper salt and a tin salt for a period of 0.5-6 hours at a temperature range of 45-75° C. The method further includes heating the second mixture at a temperature range of 65-500° C. for a period of 2-7 hours to obtain the copper oxide (CuO) co-doped tin dioxide ($SnO_2$) nano-spikes.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4A-4E shows schematic diagrams of (FIG. 4A) real camera-view from top, (FIG. 4B) magnified view of the gold p-chip, (FIG. 4C) fabrication of the copper oxide (CuO) co-doped tin dioxide ($SnO_2$) (CTO) nano-spikes onto the gold p-chip sensing area with a polymer matrix (NAFION), (FIG. 4D) proposed reaction mechanism of 4-nitrophenol (4-NP) at the surface modified electrode of the present disclosure, and (FIG. 4E) depicts outcomes of I-V experimental results;

Figure 1:
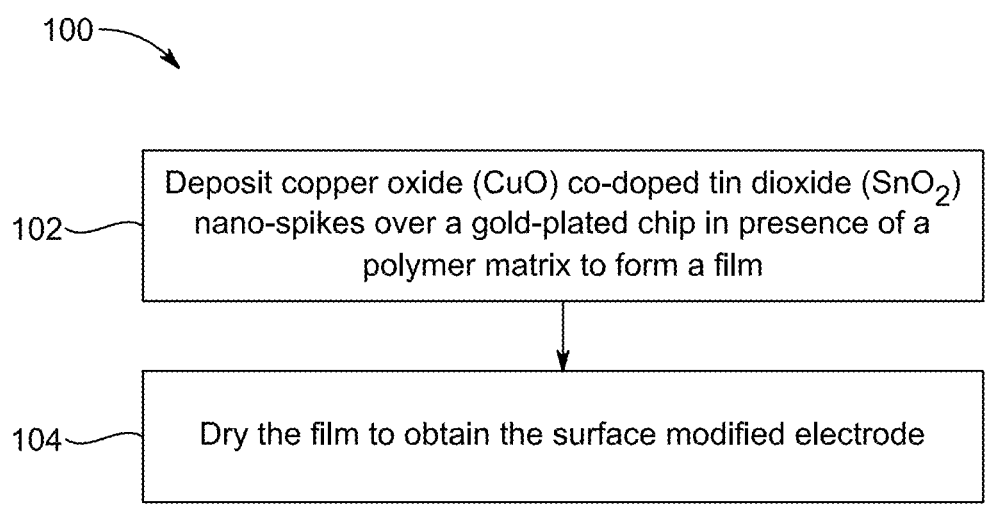
FIG. 1 is an exemplary flow chart illustrating a method for preparing the copper oxide (CuO) co-doped tin dioxide ($SnO_2$) nano-spikes.

It should be appreciated by those skilled in the art that any diagram herein represents conceptual views of illustrative systems embodying the principles of the present disclosure.

DETAILED DESCRIPTION

Reference will now be made in detail to specific embodiments or features, examples of which are illustrated in the accompanying drawings. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps, and processes described herein are not to be construed as necessarily requiring their performance in the particular order discussed or illustrated, unless specifically identified as an order of performance. It is also to be understood that additional or alternative steps may be employed, unless otherwise indicated.

As used herein, "a surface modified electrode" refers to an electrode that has its surface modified for different electrochemical functions.

As used herein, "working electrode" refers to the electrode in an electrochemical cell/device/sensor on which the electrochemical reaction of interest is occurring.

As used herein, "counter-electrode", is an electrode used in an electrochemical cell for voltametric analysis or other reactions in which an electric current is expected to flow.

As used herein, an "analyte" is a substance whose chemical constituents are being identified and measured.

As used herein, an "electrochemical sensor" converts the information associated with electrochemical reactions (the reaction between the surface modified electrode and the analyte) into an applicable qualitative or quantitative signal.

As used herein, a "voltammogram" is a graph that can be drawn after an electrochemical experiment. This graph has a typical, recognizable form in which the electron flow (current: I) is measured in Volt against the potential (E).

As used herein, "limit of detection (LOD)" is the smallest concentration of an analyte in a test sample that can be easily distinguished from zero.

As used herein, "limit of quantification (LoQ)" is the smallest concentration of an analyte in the test sample that can be determined with acceptable repeatability and accuracy.

As used herein, "linear dynamic range (LDR)" is the range of concentrations where the signals are directly proportional to the concentration of the analyte in the sample.

As used herein, "selectivity" is the quality of the electrochemical response that can be achieved without interference for any other substance.

As used herein, "sensitivity" is the change in the electrochemical response with regard to a change in the concentration of the analyte.

As used herein, "amount" refers to the level or concentration of one or more reactants in a reaction mixture.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Embodiments of the present disclosure are directed to a surface modified electrode having (CuO) co-doped tin oxide ($SnO_2$) nano-spikes or "CTO nano-spikes" modified on a gold microchip. The surface modified electrode can be used in an electrochemical sensor or "sensor" as a working electrode for stable, non-enzymatic detection of analytes. The analyte(s) include one or more of ethanol, hydrazine, chloroform, methanol, and phenolic compounds like phenyl hydrazine, nitrophenols, aminophenols and chlorophenols. In an example, the analyte is 4-nitrophenol. The fabrication of the gold microchip surface with the CTO nano-spikes imparts higher sensitivity, large-dynamic concentration ranges, long-term stability, and improved electrochemical performances towards 4-nitrophenol, thereby circumventing the drawbacks associated with prior art. Although, the present disclosure describes the use of the electrochemical sensor for detection of 4-nitrophenol, the sensor of the present disclosure may be adapted for detection of other analytes as well.

In an aspect, the surface modified electrode or herein referred to as "the electrode" includes a gold-plated chip (an electrically conducting substance). The term chip may be otherwise referred to as microchips as well. In an example, the gold-plated chip is a gold p-chip. A sensing area is defined within the gold p-chip on which is disposed the copper oxide (CuO) co-doped tin dioxide (SnO$_2$) nano-spikes. CuO functions like a p-type semiconductor, while SnO$_2$ functions as a n-type semiconductor. These two oxides haves been doped to obtain the nano-spikes. The surface modification of the gold p-chip with the nano-spikes is to introduce new or desirable physical or chemical properties, such as increased surface area, or adsorption or absorption capacity to one or more analytes of interest. In an example, thickness of the nano-spikes that are disposed on the gold-plated chip is about 1 nanometer to about 50 nanometers. Further, the nano-spikes have an average particle size in a range of about 12.5 nanometers, and an average diameter in a range of about 10.0 to 30.0 nanometers. The fabrication of the nano-spikes to the gold u-chip is achieved through use of a polymer matrix. The polymer matrix is configured to bind (as conducting coating binder) the gold p-chip and the nano-spikes by physiosorbed (physical adsorption) technique. In an example, the nature of bonding between the gold p-chip and the nano-spikes is a covalent bond. In an example, the polymer matrix is a sulfonated tetrafluoroethylene-based fluoropolymer (NAFION or NFN). NAFION is a conducting polymer and improves the electron transfer rate when the analyte contacts the electrode. In an example, the electrode is Au-p-chip/nano-spikes/NFN.

In another aspect, the electrochemical sensor for detecting 4-NP is described. The sensor includes two electrodes, namely, the surface modified electrode or the working electrode, and a platinum wire as a counter-electrode. Although the present disclosure describes a 2-electrode system (the working electrode and the counter-electrode) in the sensor, the sensor may be adapted to have a 3-electrode or a 4-electrode or a multi-electrode system to detect one or more analytes. In an example, the working electrode and the counter-electrode are connected to each other by way of electrical interconnects that allow for passage of current between the electrodes, when a potential is applied between them. In an example, the working electrode has a cross-section diameter of 1.68 millimeters, and the counter-electrode as a cross-section diameter of 0.2 millimeters. In another embodiment, the working electrode and the counter-electrode have the same dimensions. The working electrode and the counter-electrode may be arranged as obvious to a person of ordinary skill in the art. In an example, the electrode configuration of the electrochemical sensor may be designed based on the type of analyte to be sensed and type of detection methodology.

The sensor becomes operable when one or more analytes of interest, such as chlorophenol or 4-nitrophenol, are brought in contact with the working electrode. A chemical reaction between the working electrode and the analyte occurs causing a change in chemical information associated with the analyte. In an example, the change in chemical information could be a change in oxidation state. In other words, the analyte may undergo a redox (oxidation-reduction) reaction resulting in loss of electrons, when it is brought in contact with the working electrode. The electrochemical sensor is configured to determine a change in chemical information caused by the analyte on contact with at least a portion of the surface modified electrode, and further transduce the change in chemical information associated with the analyte to an electrical signal. In an example, the electrical signal is indicative of a concentration level of the analyte. Therefore, the greater the concentration of the analyte, the stronger is the signal.

In an embodiment, the sensor has a sensitivity of 1.78 $\mu A \mu M^{-1}$ cm$^{-2}$ towards 4-nitrophenol.

In another embodiment, the electrochemical sensor is configured to detect 4-nitrophenol across a concentration range of 2.3 pM.

In yet another embodiment, the electrochemical sensor has a linear dynamic range across a range of 0.1 nanomolar to 1.0 micromolar.

In yet another embodiment, the electrochemical sensor has a linearity value in the linear dynamic range as 0.9994.

In yet another embodiment, the electrochemical sensor has a response time of about 10 seconds once the analyte is in contact with the working electrode.

In yet another embodiment, the electrochemical sensor has a limit of quantification of about 7.67 picomolar.

Referring to FIG. 1A, a method for preparing the surface modified electrode is described. In an embodiment, the method 100 includes obtaining the gold-plated chip by any of the conventional methods known in the art. In an embodiment, the gold-plated chip is a gold p-chip. Further, a sensing area is defined in the gold-plated chip onto which are deposited the copper oxide (CuO) co-doped tin dioxide (SnO$_2$) nano-spikes (102). This process is called fabrication, and can be done by any methods known in the art. In an example, the fabrication process is performed by a photo-lithographic technique. A polymer matrix, that is capable of conducting, is further coated on the gold p-chip/nano-spikes to form a film. The film was further dried at a temperature range of about 40-45° C. for a period of about 1-3 hours to obtain the surface modified electrode (104).

In some embodiments, the method for preparing the copper oxide (CuO) co-doped tin dioxide (SnO$_2$) nano-spikes is provided. The method includes mixing an equimolar solution of a copper salt and a tin salt in an alkaline solution to obtain a first mixture. In an example, the copper salt is copper chloride, the tin salt is stannous chloride, and the alkaline solution is a solution of ammonium hydroxide. In an example, the mixing is performed for a period of 0.5-6 hours at a temperature range of 45-75° C. The first mixture is further precipitated with an organic solvent to obtain a second mixture. In an example, the organic solvent is ethanol. The second mixture is heated to a temperature range of 65-500° C. for a period of 2-7 hours to obtain the copper oxide (CuO) co-doped tin dioxide (SnO$_2$) nano-spikes.

While most of the conventional methods are a compromise between selectivity and sensitivity, or suffer from problems associated with high costs, the electrochemical sensor of the present disclosure can detect 4-nitrophenol at nanomolar concentrations with high sensitivity and selectivity with a substantially short response time.

EXAMPLES

Materials and Methods

The analytical grade chemicals (CuCl$_2$ and SnCl$_2$) were used to synthesize copper oxide (CuO) co-doped tin dioxide (SnO$_2$) nano-spikes by applying wet-chemical method in alkaline phase. To assess the selectivity and sensitivity of the working electrode towards analytes, nine chemicals that are hazardous to environment such as ethanol, hydrazine, 4-nitrophenol, chloroform, methanol, phenyl hydrazine, 2,4 dinitrophenol, 4-amino phenol, and 3-chlorophenol were in analytical grade and were procured from the commercial sources such as Sigma-Andrich USA. Mono- & disodium phosphate buffer and 5% NAFION in ethanol were obtained from commercial sources such as Sigma Andrich. Fourier Transform Infrared Spectroscopy (FT-IR) spectra of the synthesized nano-spikes were measured on a spectrum-100 FT-IR spectrophotometer in the mid-IR range purchased from Bruker. The powder X-ray diffraction (XRD) patterns of synthesized nano-spikes were recorded by X-ray diffractometer from PANalytical diffractometer equipped with Cu-Kα1 radiation (1=1.5406 nm). The generator voltage (45.0 kV) and generator current (40.0 mA) were applied for the XRD measurement (ALPHA, USA). To confirm the structure and elemental compositions of synthesized metal oxides, the Field Emission Scanning Electron Microscope (FESEM), and Energy dispersive X-ray analysis (EDS) analysis were executed by an instrument model JEOL, JSM-7600F (Japan). I-V technique (two electrodes disposed on microchip) is measured by using Keithley-Electrometer from USA.

Example 1: Synthesis of the (CuO) Co-Doped Tin Dioxide ($SnO_2$) Nano-Spikes (CTO Nano-Spikes)

The CTO nano-spikes were synthesized by a solution method. For this purpose, an equimolar concentration (0.1 M) of copper salts (copper chloride) and tin salts (stannous chloride) and ammonium hydroxide ($NH_4OH$) were taken. 50.0 ml of each of these salts, i.e., the copper salts and the tin salts, were mixed in a 250.0 ml reactor for 30 minutes with constant stirring at 50.0° C. to obtain a first mixture. To the first mixture was added 100.0 ml of aqueous $NH_4OH$ (0.1 M) was added dropwise with constant stirring. The stirring was continued for 6 hours at 70° C. After completion of the reaction, the mixture was further cooled to room temperature (to about 25-30° C.), to obtain a bluish precipitate of the CTO nano-spikes. The precipitate was further washed with double distilled ethanol and water sequentially, followed by drying at room temperature for 30 minutes, followed by 2 hours of heating in an oven at 65° C., and 5 hours of heating at 500° C., to convert the CTO nano-spikes to calcined CTO nano-spikes. The nano-spikes thus obtained were further characterized by FT-IR, XRD studies, FESEM, and EDS.

Example 2: Fabrication of Au (Gold) μ-Chip with CTO Nano-Spikes

The choice of the working electrode or the first electrode plays a critical role in determining the sensitivity and selectivity of the sensor towards detection of 4-nitrophenol. The working electrode is the Au p-chip modified/fabricated with the CTO nano-spikes synthesized in Example 1. To achieve this objective, the synthesized CTO nano-spikes was used to make a slurry with ethanol and subjected to coating as a thin layer on the Au μ-chip. To improve the stability of the working electrode, a drop of 5% of the polymer matrix, sulfonated tetrafluoroethylene-based fluoropolymer (NAFION), was added to the gold Au μ-chip, to facilitate bonding between the CTO nano-spikes and the gold Au μ-chip to obtain Au μ-chip/CTO nano-spikes/NAFION or a "composite". The composite functions as a working electrode, and a platinum wire is used as the counter-electrode.

Results and Discussion

Figure 2A:
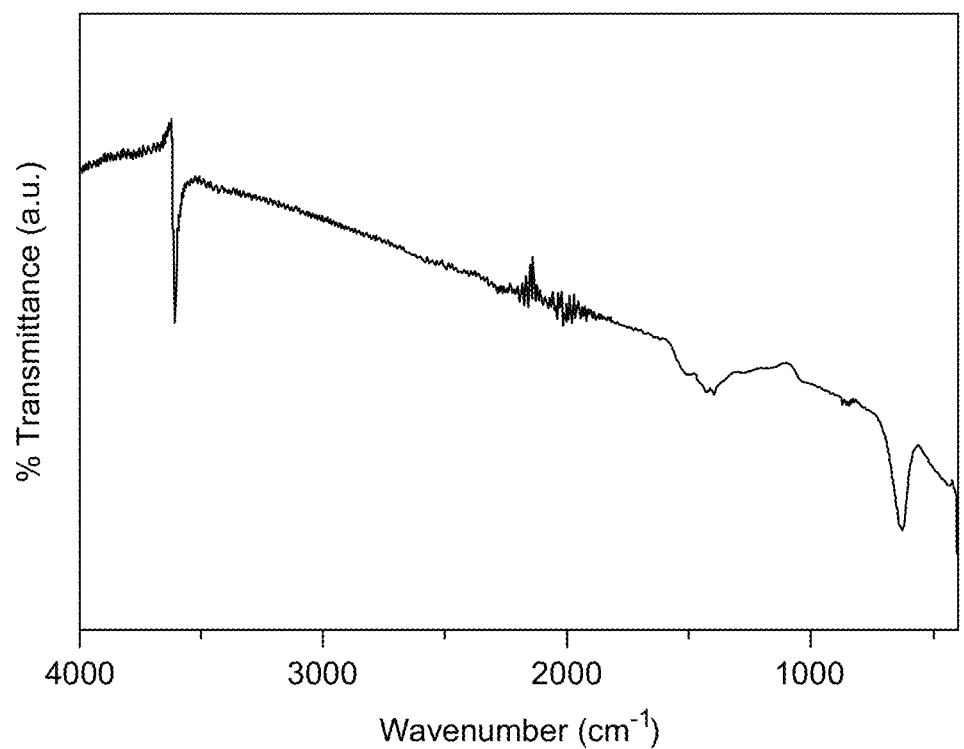
FIG. 2A shows Fourier-transform infrared spectroscopy (FTIR) spectrum of the copper oxide (CuO) co-doped tin dioxide ($SnO_2$) nano-spikes.

The FT-IR spectrum of synthesized copper oxide (CuO) co-doped tin dioxide ($SnO_2$) nano-spikes was investigated to assess atomic and molecular vibrations. The corresponding results are presented in FIG. 2A. The $SnO_2$ displays an absorption band at 638 $cm^{-1}$ in accordance with the metal-oxygen vibrational mode of absorption, co-relating to literature values. The absorption band appeared at 850 and 1030 $cm^{-1}$ is due to vibration between Cu and O atoms. The absorption bands at 1510 to 1405 $cm^{-1}$ are because of the overtone. The peaks confirm the formation of the CTO nano-spikes.

Figure 2B:
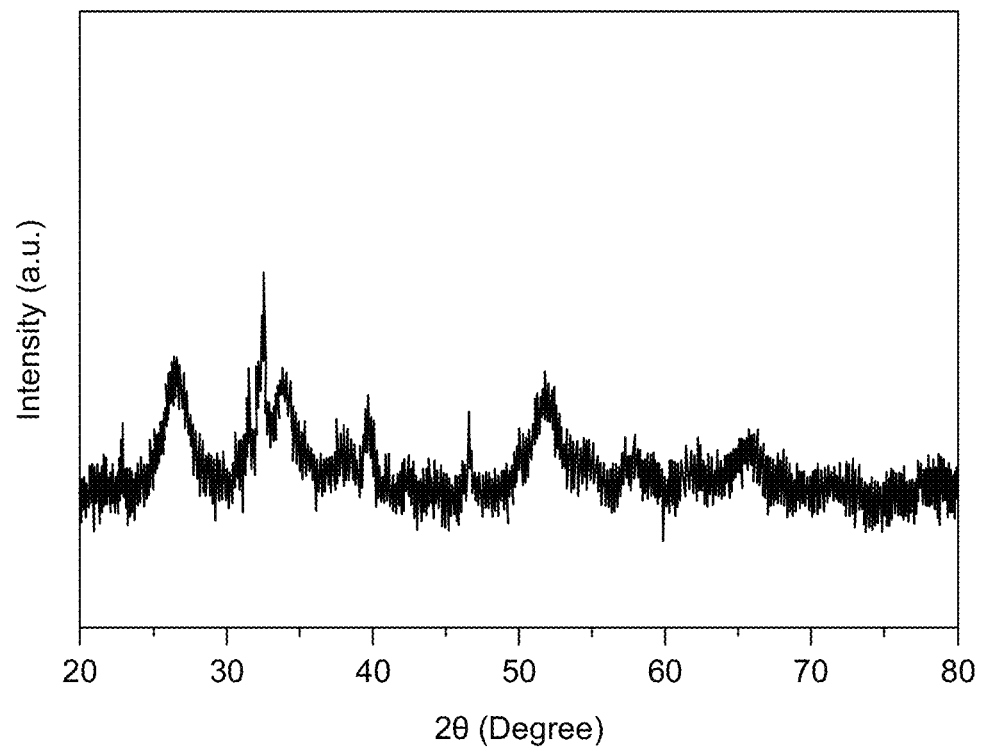
FIG. 2B shows X-ray diffraction (XRD) spectrum of the copper oxide (CuO) co-doped tin dioxide ($SnO_2$) nano-spikes.

The evaluation of phase crystallinity and particles size was studied by XRD pattern. FIG. 2B shows X-ray diffraction (XRD) spectrum of synthesized copper oxide (CuO) co-doped tin dioxide ($SnO_2$) nano-spikes. Peaks appeared at $2\theta=32.6°$, $39.0°$, $62.0°$, $66.0°$, and $68.3°$ index as (110), (111), (113), (311), (220), are matched to the data of cubic CuO as in literature. Again, XRD peaks appeared at $2\theta=26.2°$, $33.8°$, $37.7°$, $51.7°$, and $57.5°$, can be consigned to (110), (101), (200), (211), and (002), crystal planes of shape $SnO_2$, respectively, as in literature. The average particle size (D) was obtained as 10-30 nm as calculated using the Scherer equation.

CTO Nano-Spikes Characterization

Figure 3A:
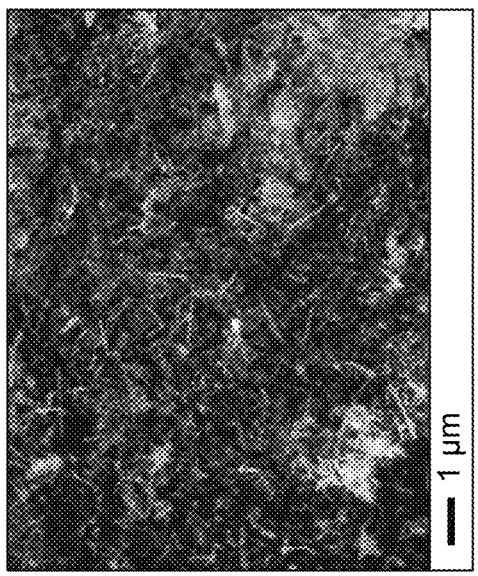
FIG. 3A-3D shows morphological analysis of the copper oxide (CuO) co-doped tin dioxide ($SnO_2$) nano-spikes.
Figure 3B:
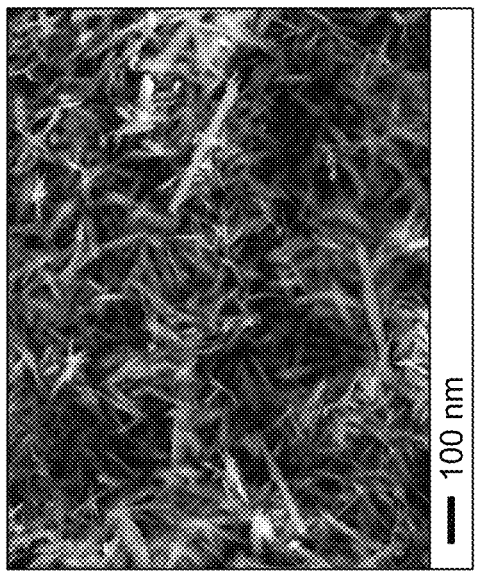
Figure 3C:
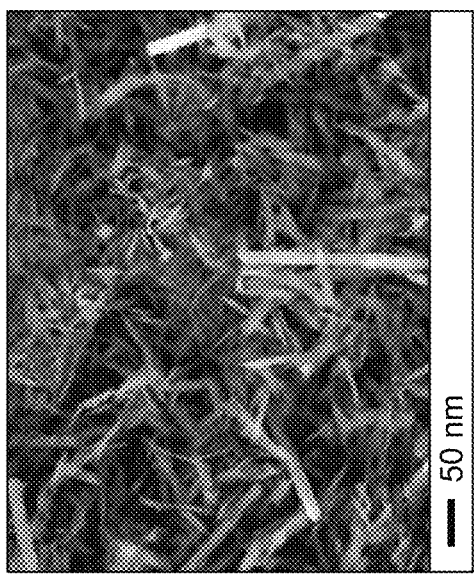
Figure 3D:
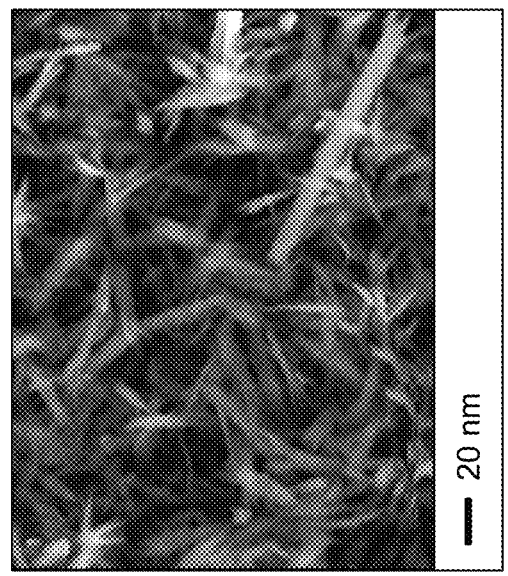
Figure 3E:
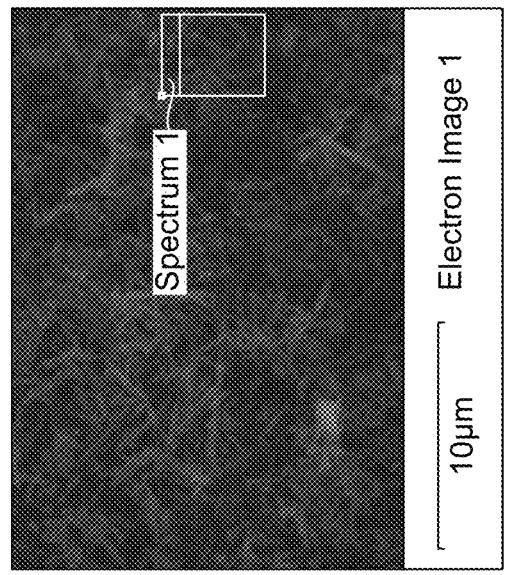
FIG. 3E-3F shows elemental analysis of the copper oxide (CuO) co-doped tin dioxide ($SnO_2$) nano-spikes.
Figure 3F:
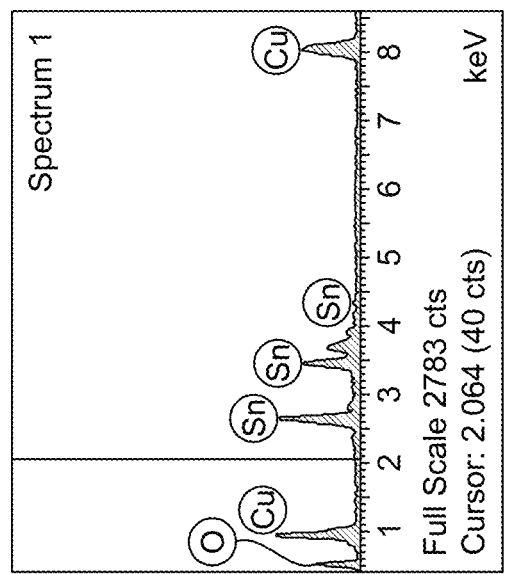

The structural and atomic compositions of copper oxide (CuO) co-doped tin dioxide ($SnO_2$) nano-spikes was identified by FESEM and EDS analysis. FIGS. 3A-3D depict the morphology as well as surface texture of the CTO nano-spikes as studied by FESEM. From FIGS. 3A-3D, it can be observed that the CTO nano-spikes have a morphology with a nano-size distribution. The calculated diameter of CTO nano-spikes was in the range of 10.0 to 30.0 nanometer. The average diameter of the CTO nano-spikes was found to be of 25.0 nanometer. FIG. 3E and FIG. 3F provide elemental composition of CTO nano-spikes by EDS. These figures suggest that the CTO nano-spikes consists of Cu, Sn, and O with a respective weight percentage of 34.66%, 37.90%, and 27.44% respectively.

FIG. 4 is a schematic diagram of (a) real camera-view of μ-chip from top, (b) magnified view of the gold-microchip, (c) fabrication of the copper oxide (CuO) co-doped tin dioxide ($SnO_2$) (CTO) nano-spikes onto the gold-microchip sensing area with polymer matrix (NAFION), (d) proposed reaction mechanism of 4-nitrophenol at the surface modified electrode of the present disclosure, and (e) outcomes of I-V experimental results. The gold μ-chip fabricated with nano-spikes can be done by any conventional techniques known in the art. A top view of the gold μ-chip used is presented in FIG. 4A. A magnified view of the image 4A is presented in FIG. 4B. From FIG. 4B it can be observed that the size of the gold μ-chip is 5.0 mm×5.00 mm. FIG. 4C depicts a magnified construction view of the internal gold μ-chip center. As can be observed from the FIG. 4C, the diameter of the surface modified electrode was 1.68 mm as can be observed in the center of the gold μ-chip. The sensing area, the area on which the nano-spikes are fabricated on the gold μ-chip, was 0.2217 $cm^2$.

FIG. 4D depicts a proposed reaction mechanism of 4-nitrophenol on contact with the surface modified electrode, as suggested below in the equations (Eq. i & ii) of Scheme 1.

Scheme 1

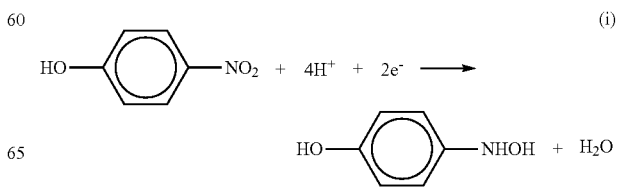

-continued

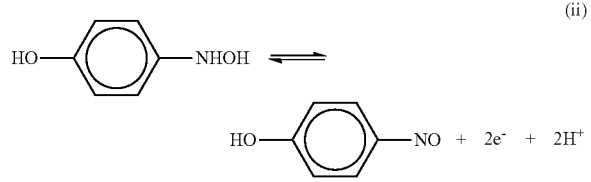

According to the literature, 4-NP is converted to μ-hydroxyaminophenol, as can be observed in the Eq. (i) and then the μ-hydroxyaminophenol is oxidized to μ-nitrosophenol, as can be observed in the Eq. (ii) followed by a subsequent reversible reduction. From Scheme 1, it can be observed that when 4-NP molecules are brought in contact with the electrode, the 4-NP molecules were oxidized by releasing two electrons with two protons to the conduction band (Au μ-chip/CTO nano-spikes). This change in chemical information (loss of electrons) caused by 4-NP on contact with at least a portion of the Au μ-chip/CTO nano-spikes causes the sensor to transduce the change in chemical information associated with the analyte to an electrical signal.

The real electrical responses of target 4-NP are investigated by simple and reliable I-V technique with electrode of the present disclosure, which is presented in FIG. 4E. A significant amplification in the current response with applied potential is noticeably confirmed. The 4-NP in presence of doped nano-spikes releases 2 electrons to the reaction system (conduction band, C.B.), which improved and enhanced the current responses against potential during the I-V measurement at room conditions.

Figure 5A:
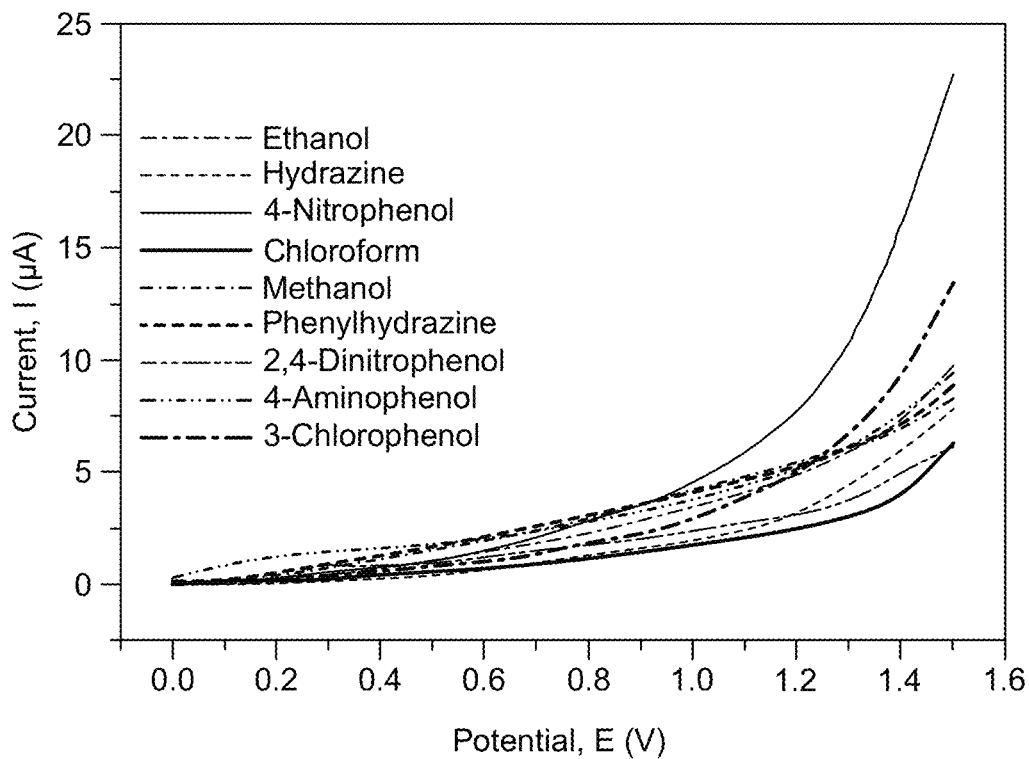
FIG. 5A illustrates a I-V graph depicting the selectivity of the surface modified electrode towards varied analytes.

One of the most essential and desirable features of an electrochemical sensor lies in its ability to distinguish the analyte of interest, even at very low concentrations, from interfering chemicals. Because of the ability to distinguish interfering agents from the 4-NP with very close electrochemical behavior, the interference study is one of the important methods of analytical chemistry. In other words, the electrochemical sensor ought to be selective and sensitive. To assess the selectivity of the electrode towards 4-NP, 4-nitrophenol having a concentration of 2.0 μM; 25.0 μL was dissolved in phosphate buffer saline, maintained at pH 7.0. Eight other interfering chemicals, maintained at the same concentration, were added to a sample containing the analyte. The interfering chemicals are ethanol, hydrazine, 4-nitrophenol, chloroform, methanol, phenyl hydrazine, 2,4 dinitrophenol, 4-amino phenol, and 3-chlorophenol. The concentration of the interfering chemicals was maintained at 2.0 μM. From the FIG. 5A, it can be observed that although the selectivity towards ethanol, methanol, aminophenol and chlorophenol was found to be moderate, best amperometric response was observed, given all other reaction conditions kept constant, was observed with 4-nitrophenol at applied potential range of 0.1-1.5 V.

Figure 5B:
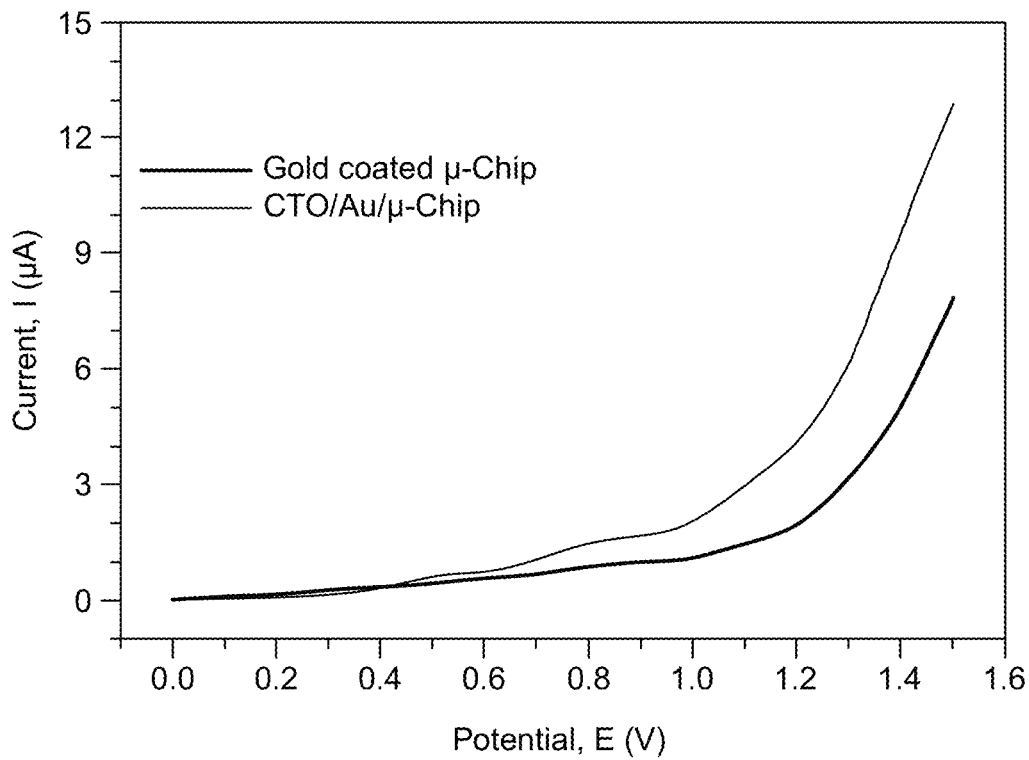
FIG. 5B is a voltammogram comparing the electrochemical behavior with a gold p-chip, and the surface modified electrode, in sensing 4-nitrophenol in phosphate buffer saline (PBS)

In yet another study, the current response of the surface modified electrode was compared to that of a bare/uncoated electrode (Au μ-chip) under identical reaction conditions in the presence of 4-NP. For this purpose, the analyte, i.e., the 4-nitrophenol was dissolved in phosphate buffer saline. Amperometric response for the surface modified electrode was recorded and compared with that of the bare electrode at applied potential range of 0.1-1.5 V. From the FIG. 5B, it can be observed the current response for the bare/uncoated electrode towards 4-nitrophenol is found reduced in comparison to the current response generated with the surface modified electrode (CTO/Au-μ-chip), for the same concentration of 4-nitrophenol. In other words, a substantially higher current response, about by 1.5-fold, was observed with the surface modified electrode in comparison to the bare electrode.

Figure 5C:
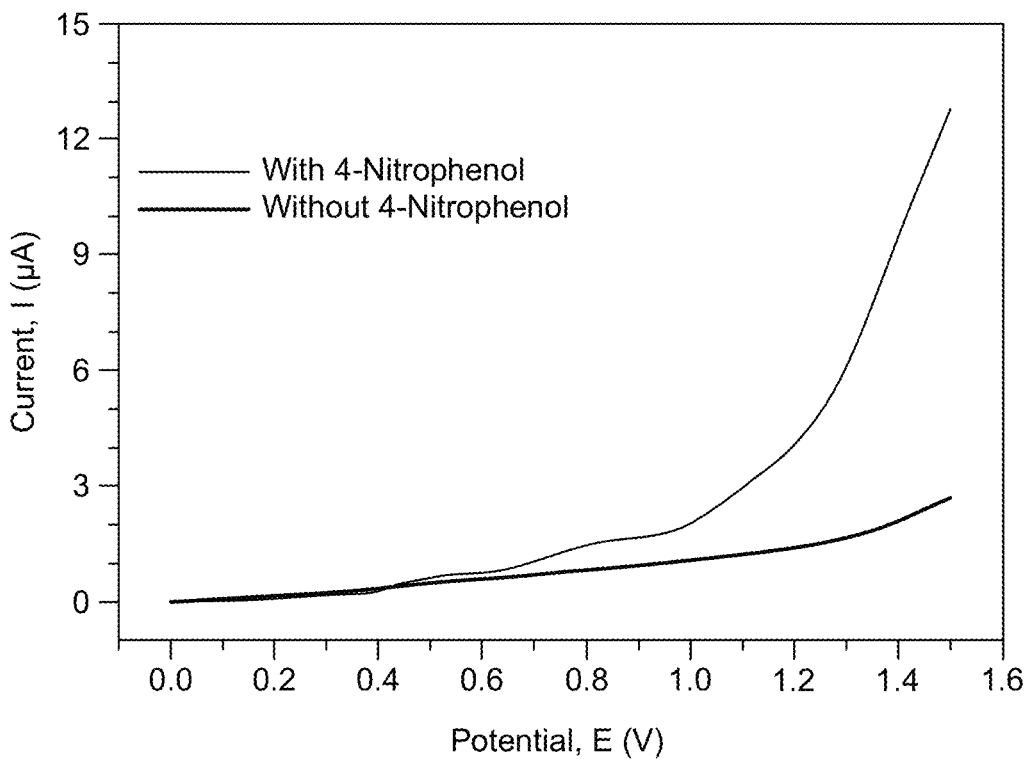
FIG. 5C is a voltammogram comparing the effect of 4-nitrophenol in phosphate buffer saline on the surface modified electrode.
Figure 5D:
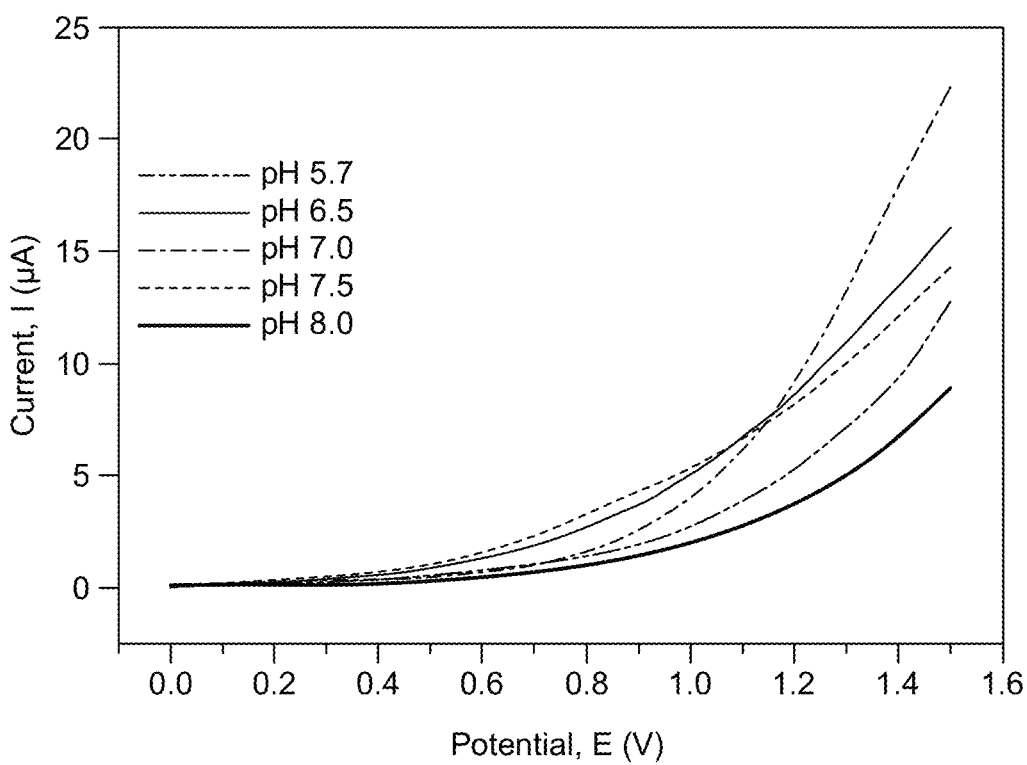
FIG. 5D is a voltammogram depicting the effect of pH on the surface modified electrode in the presence of 4-NP in PBS within a pH range of 5.7-8.0.

To ascertain the sensitivity gain from the surface modified electrode, the current responses of the working electrode in the presence and absence of 4-nitrophenol were recorded. The results of this study are presented in FIG. 5C. From the FIG. 5C, it can be observed that the current signal is slightly reduced in the absence of the 4-nitrophenol. Upon injecting 4-nitrophenol, at a concentration of 2.0 μM; 25.0 μL, a significant upsurge of current output is observed indicating a greater sensing ability of the surface modified electrode at ambient conditions.

pH is an important factor affecting the performance of surface modified electrode. The effect of pH of 4-nitrophenol on the sensing ability of the surface modified electrode was further evaluated, and the results of this experiment are presented in FIG. 5D. For this purpose, the analyte, i.e., the 4-nitrophenol was dissolved in phosphate buffer saline. The concentration of the 4-nitrophenol (2.0 μM, 25.0 μL) was kept constant, while the pH was adjusted across a range of 5.7 to 8. The study was performed specially at the pH values—5.7, 6.6, 7.0, 7.5 and 8.0. The pH was adjusted using chemicals known in the art. All other process parameters were kept identical while performing the experiment. The current response at different pH towards 4-nitrophenol was noted. From FIG. 5D, it can be observed that although the electrochemical sensor is effective in detection of 4-nitrophenol at a wide range of pH values, best results were observed at a slightly acidic or neutral pH values. The current response decreased more quickly in an alkaline environment than in acidic environment. The electric signal or the current response was found to perform best at neutral pH (between 6.5-7.0), more particularly at pH 7.0. Collectively, from these findings it is evident that the electrode exhibits superior sensitivity with enhanced current response at pH 7.0, because of the higher rate of electron transfer at pH 7.

Figure 6A:
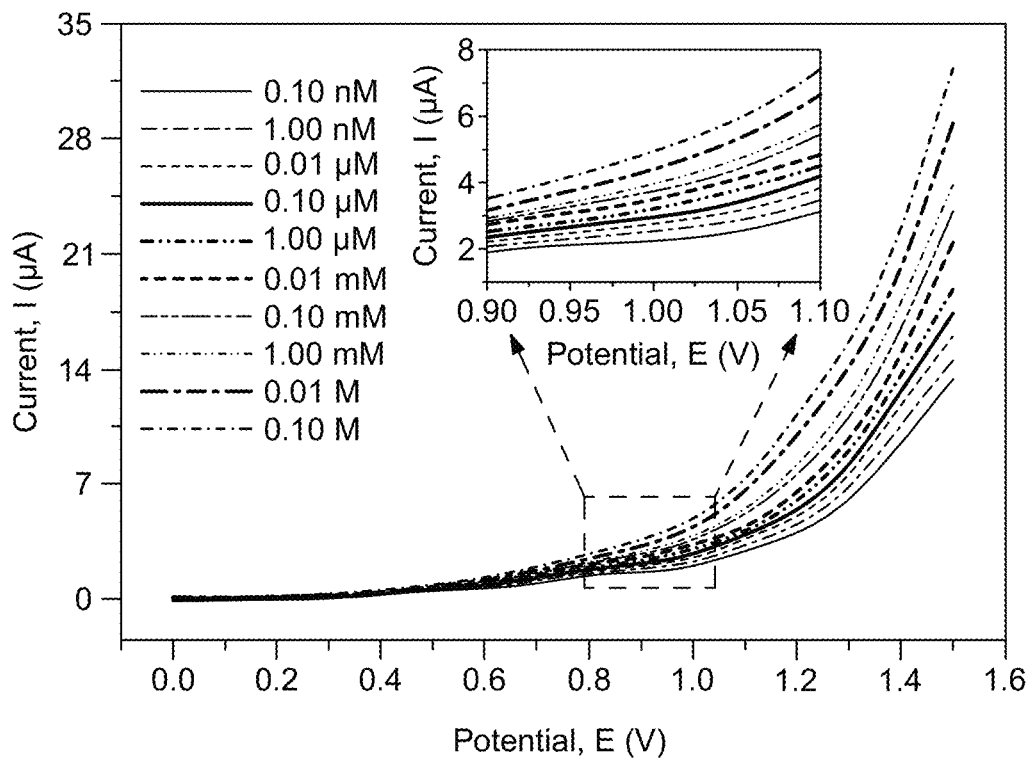
FIG. 6A is an I-V graph depicting the effect of concentration of 4-nitrophenol on current change with the surface modified electrode.

Further, the effect of concentration of 4-nitrophenol on current change with the surface modified electrode of the present disclosure is studied, and the results are presented in FIG. 6A. For this purpose, 25.0 μL of various concentrations of 4-nitrophenol ranging from 0.1 nM to 0.1 M are prepared in 5.0 ml of phosphate buffer saline. The pH of all these solutions was maintained at 7. The potential between the working electrode and the counter-electrode was in a range of 0.1-1.5 V. From the FIG. 6A, it can be observed that the current changes between the electrode is a function of 4-nitrophenol concentration. A magnification of output currents for +0.9 V to +1.1 V is presented in FIG. 6A. Increasing the concentration of 4-nitrophenol enhanced the output current. In other words, it was observed that the output current increased gradually from a dilute (0.10 nM) to a concentrated (0.1 M) 4-NP solution. The various concentrations on 4-nitrophenol (0.10 nM to 0.1 M) prepared were further used to assess the limit of detection (LOD) and linear dynamic range (LDR) with the electrochemical sensor.

Figure 6B:
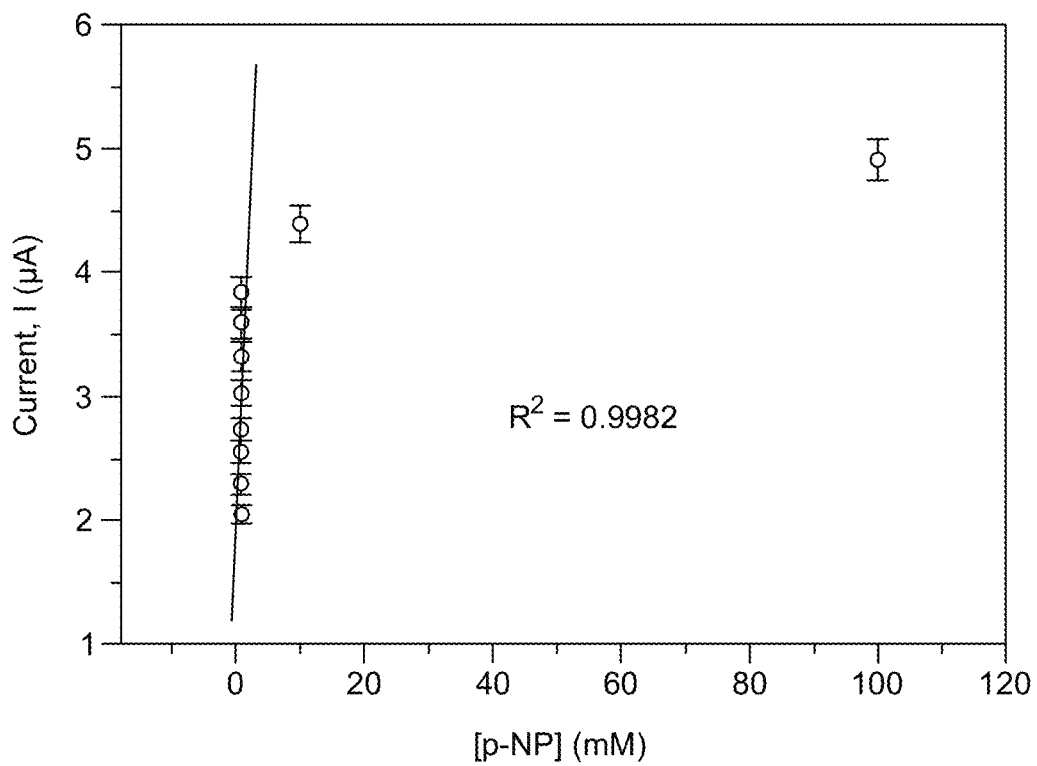
FIG. 6B is a calibration plot of slope obtained from FIG. 6A vs 4-NP or para-NP.

FIG. 6B is a calibration plot of slope obtained from FIG. 6A vs 4-NP or para-NP. From the calibration curve at +1.0 V (FIG. 6B) extremely high sensitivity value was estimated as $1.78\ \mu A\mu M^{-1}\ cm^{-2}$, while the LDR of the electrochemical sensor was obtained as 0.10 nM-1.0 mM: $R^2=0.9982$. An ultra-low LOD value was also estimated as 2.3±0.1 pM [3×N/S].

Analysis of Real Samples by the Electrochemical Sensor

To test the effectiveness, the electrochemical sensor was used to detect 4-NP from various sources, namely the industrial ETP plant (S1) and household wastewater (S2). All the solid particles were removed from S1 and S2 by filtration. The samples were analyzed with the electrochemical sensor of the present disclosure. Standard addition method was used in an aqueous medium to validate the correctness of 4-NP detection. For this purpose, 25.0 µL of 4-NP solutions of varying concentrations and an equal volume of real samples (S1 and S2) were mixed separately in PBS and the samples were analyzed. The results were presented in Table 1.

TABLE 1

Analysis of real environmental samples by electrochemical method for the detection of 4-NP using the electrochemical sensor

| Real samples | Concentration of 4-NP added | Concentration determined by the electrochemical sensor | Recovery (%) | RSD (%) (n = 3) |
|---|---|---|---|---|
| S1 | 2.000 nM | 2.032 nM | 101.6 | 4.3 |
|    | 2.000 µM | 1.960 µM | 98.0 | 2.8 |
| S2 | 2.000 nM | 2.022 nM | 101.0 | 3.4 |
|    | 2.000 µM | 2.068 µM | 103.4 | 3.3 |

From Table 1, it can be observed that the electrochemical sensor had a 4-NP recovery of ~100 percent. Therefore, we can conclude that this electrochemical sensor is acceptable, accurate, and reliable in determining 4-NP from real samples.

Further, a comparative data between the surface modified electrode of the present disclosure and other electrode materials used in prior arts can be observed in Table 2.

TABLE 2

Comparative study of electrochemical sensors with different electrodes towards 4-NP detection

| Electrode material | Techniques | LDR (µM) | LOD (µM) | Sensitivity ($\mu A \mu M^{-1} cm^{-2}$) |
|---|---|---|---|---|
| BDAC (prior art) | LSV | up to 500 | 0.16 | 5.81 |
| ABPGH (prior art) | LSV | 0.02-8.0 & 8.0-100 | 0.008 | 2.717, 1.8117 $\mu A \mu M^{-1}$ |
| NiO—CeO$_2$ (prior art) | CV | 1 to 20 | 2.48 | 3.68 |
| Fe$_3$O$_4$/G (prior art) | DPV | 10 to 100 | 4 | $8.067 \times 10^{-8}$ $\mu A \mu M^{-1}$ |
| TLISS (prior art) | DPV | 1.43-55.93 & 55.93-553.7 | 1.09 | — |
| CTO nano-spikes/Au µ-chip (electrochemical sensor of present disclosure) | I-V | 0.1 nM-1.0 mM | 2.3 pM | 1.78 |

BDAC = biomass derived activated carbons;
ABPGH = acetylene black paste and graphene hybrid;
TLISS = Tremella-like indium silver sulfide.

From Table 2, it can be observed that the CTO nano-spikes/Au-µ-chip sensor assembly exhibits a very high sensitivity towards 4-NP with low LOD in comparison to other 4-NP sensors, with notable stability, sensitivity, and reliability.

It is understood that the examples, embodiments and teachings presented in this application are described merely for illustrative purposes. Any variations or modifications thereof are to be included within the scope of the present application as discussed.

INDUSTRIAL APPLICABILITY

The electrochemical sensor of the present disclosure offers several advantages over the prior art for detection of 4-nitrophenol. One advantage of the sensor of the present disclosure is excellent reproducibility was achieved with the surface modified electrode under identical conditions, resulting in a relative standard deviation (RSD) of ~3.4%. Another advantage, according to certain embodiments, is that the CTO/Au-µ-chip electrochemical sensor showed repeatability for seven successive runs in 2.0 µM 4-NP, resulting in a current variance of RSD ~4.1%. Yet another advantage of the embodiments according to the present disclosure is long term stability. This was demonstrated by assessing the sensitivity of the electrochemical sensor over a period of 4 weeks. After four weeks of electrode storage under room conditions a nominal decrease in sensitivity was observed, suggesting long term stability. Enhanced electro-catalytic property in detecting 4-NP, handy nature, good reproducibility, wide LDR, high sensitivity, and low LOD, makes CTO/Au-µ-chip electrochemical sensor an excellent choice for the detection of 4-NP.

It is understood that the examples, embodiments and teachings presented in this application are described merely for illustrative purposes. Any variations or modifications thereof are to be included within the scope of the present application as discussed.

ACKNOWLEDGMENT

The authors extend their appreciation to the Deputyship for Research & Innovation, Ministry of Education in Saudi Arabia for funding this research work through the project number (2021-030) and King Abdulaziz University, DSR, Jeddah, Saudi Arabia.

The invention claimed is:

1. A surface modified electrode comprising:
   a gold-plated chip;
   copper oxide (CuO) co-doped tin dioxide (SnO$_2$) nano-spikes disposed over the gold-plated chip; and
   a polymer matrix configured to bind the gold-plated chip with the copper oxide (CuO) co-doped tin dioxide (SnO$_2$) nano-spikes.

2. The surface modified electrode according to claim 1, wherein the copper oxide (CuO) co-doped tin dioxide (SnO$_2$) nano-spikes have an average particle size of about 12.5 nanometers.

3. The surface modified electrode according to claim 1, wherein the copper oxide (CuO) co-doped tin dioxide (SnO$_2$) nano-spikes have an average diameter in a range of about 10.0 to 30.0 nanometers.

4. The surface modified electrode according to claim 1, wherein the polymer matrix is a sulfonated tetrafluoroethylene-based fluoropolymer.

5. An electrochemical sensor for detecting an analyte comprising the surface modified electrode according to claim 1, wherein the electrochemical sensor is configured to:
   determine a change in chemical information caused by the analyte on contact with at least a portion of the surface modified electrode; and
   transduce the change in chemical information associated with the analyte to an electrical signal.

6. The electrochemical sensor according to claim 5, wherein the electrical signal is indicative of a concentration level of the analyte.

7. The electrochemical sensor according to claim 5 further comprising, a counter-electrode, wherein the counter-electrode is a platinum wire.

8. The electrochemical sensor according to claim 5, wherein the analyte is selected from a group consisting of ethanol, hydrazine, nitrophenols, chloroform, methanol, phenyl hydrazine, aminophenol and chlorophenol.

9. The electrochemical sensor according to claim 5, wherein the analyte is 4-nitrophenol.

10. The electrochemical sensor according to claim 9 having a sensitivity of 1.78 $\mu A \mu M^{-1}$ $cm^{-2}$.

11. The electrochemical sensor according to claim 9, configured to detect 4-nitrophenol across a concentration range of 2.3 pM.

12. The electrochemical sensor according to claim 9, having a linear dynamic range across a range of 0.1 nanomolar to 1.0 micromolar; linearity value in the linear dynamic range as 0.9994; a response time of about 10 seconds; and a limit of quantification of about 7.67 picomolar.

13. A method of preparing a surface modified electrode, the method comprising:
   disposing copper oxide (CuO) co-doped tin dioxide ($SnO_2$) nano-spikes over a gold-plated chip in the presence of a polymer matrix to form a film; and
   drying the film to obtain the surface modified electrode.

14. The method according to claim 13 further comprising, drying the film at a temperature range of about 40-45° C. for a period of about 1-3 hours.

15. The method according to claim 13 further comprising, preparing the copper oxide (CuO) co-doped tin dioxide ($SnO_2$) nano-spikes by:
   mixing an equimolar solution of a copper salt and a tin salt in an alkaline solution to obtain a first mixture;
   precipitating the first mixture with an organic solvent to obtain a second mixture; and
   heating the second mixture to obtain the copper oxide (CuO) co-doped tin dioxide ($SnO_2$) nano-spikes.

16. The method of claim 15, wherein the mixing step comprises mixing an equimolar solution of the copper salt and the tin salt for a period of 0.5-6 hours at a temperature range of 45-75° C.

17. The method of claim 15 wherein the heating the second mixture comprises heating the mixture at a temperature range of 65-500° C. for a period of 2-7 hours to obtain the copper oxide co-doped tin dioxide nano-spikes.

18. The method according to claim 15, wherein the copper salt is copper chloride ($CuCl_2$), and tin salt is stannous chloride ($SnCl_2$).

19. The method according to claim 15, wherein the alkaline solution comprises ammonium hydroxide.

* * * * *